Figure 1:
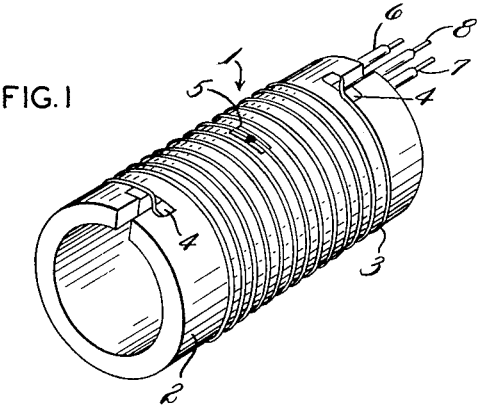

March 28, 1961     A. R. WELLS     2,977,453
ELECTRIC HEATER AND CONTROL CIRCUIT THEREFOR Filed July 29, 1958

*INVENTOR.*
ALTON R. WELLS
BY
ATTYS.

United States Patent Office  2,977,453
Patented Mar. 28, 1961

2,977,453
ELECTRIC HEATER AND CONTROL CIRCUIT THEREFOR

Alton R. Wells, 235 Edgerton Road, Akron, Ohio

Filed July 29, 1958, Ser. No. 751,795

6 Claims. (Cl. 219—20)

The present invention relates to electric heaters, and especially to a novel type of an electric heater and a control circuit provided therefor so that very desirable operating characteristics can be obtained from the heater for certain heating actions.

The present invention particularly relates to the type of electric heaters as are generally disclosed in U.S. Patent No. 2,817,068. Such heaters, in general, comprise a core on which a resistance coil is wound, an embedment in which the coil and core are positioned and which encompasses the resistor coil, and an enclosure or carrier case in which the coil and core are positioned for operative action. Leads extend from such case and the case is sealed around the heater unit received therein.

Heaters of the type referred to are used in many different places, one particular use therefor being that for coffee percolators, but they can be used as electrical heating units for other articles. In the making of coffee, the first problem is that of raising the water in the percolator to an elevated temperature at which percolation is about ready to commence. Then there is a second heating action required, at which time heat should be added to the water at a slower rate and wherein the actual percolation action, or boiling of the water occurs to percolate water through the coffee and produce the coffee drink desired. A third action also required is that of maintaining the coffee suitably hot for use without providing any excess percolation or boiling action. Heretofore there have been various types of heaters and control circuits provided for use in coffee makers, and one of such methods of connection and heater constructions comprises use of a low resistance, high wattage resistance coil in series with a high resistance unit of low wattage output. A thermostat is shunted across the second resistance and is calibrated to open at a given temperature at the end of the desired percolation time. Thus, initially only the low resistance, high wattage heater is in the heater circuit so that the water is heated and the boiling or percolation action is secured by the use of the one low resistance coil in the heater. The thermostat ultimately opens to put both resistances in series so that a low wattage heater means is made in the circuit to keep the coffee made at a desired temperature. These two different resistances are separate units and are mounted in a coffee maker in any desired manner.

Such prior type of a heater and circuit may have an additional element provided therein and that can be a third resistance member that is connected across the first two resistances and with a separate control thermostat being provided in a series circuit with such third resistance member. The third resistance is used, in addition to the first resistance, as a preliminary and auxiliary water preheat unit that is cut out by the thermostat in its circuit when a given water temperature is reached. Thus, the first two resistances would then function in the same manner as indicated hereinbefore wherein the second thermostat closing would put the first two resistances in series to provide a "keep warm" circuit.

Yet a further and more simplified type of a heater and control circuit is that wherein only one resistance is provided and it has a thermostat control in direct series connection therewith. Thus, a medium wattage heater is provided to control all of the heating action and the thermostat is of such a design that it cuts in and out at predetermined temperatures and pulses or cycles with rise and fall in the temperature of the water being heated. Hence, a smaller total wattage output is produced in the heater for "keep warm" conditions than if the circuit were continually closed and it accomplishes the same end result as the more complicated circuits referred to hereinbefore.

However, all of such previous types of circuits as used heretofore in small electric units or appliances have not been completely satisfactory. Thus it is very desirable that a high rate of heat input be supplied to the water to raise it to a temperature approaching percolation temperature, such as, for example, 180°. Then it is desirable that additional heat be relatively slowly supplied to the water so as to raise the water gradually to a boiling temperature and to then be controlled, for example, by a cycling thermostat as in one of the prior controls and gradually supply additional heat to the percolated water or coffee to maintain it in a desired "keep warm" condition. Obviously, such additional control circuit, to be commercially practical, must employ a minimum amount of aditional members over and above heaters and thermostats used heretofore.

The general object of the present invention is to avoid and overcome some of the defects in the prior types of control circuits and heater means used in small appliances such as coffee percolators, and to provide a coffee percolator heater unit characterized by the rapid input of watts and heating action to a liquid when starting the heating thereof, but with a gradual continued heating action being provided in the heater unit and control circuit when a desired predetermined temperature is reached, to maintain approximately such temperature in the water, or other fluid being processed.

Another object of the invention is to provide a one unit heater element with three terminal leads extending therefrom so that a unitary heater can be provided with two heating coils or circuits set up therein.

Further objects of the invention are to provide compact two circuit heater units and a dual thermostat of substantially the same size and cost of prior single units; to provide parallel circuits each with an individual resistance and thermostat therein for joint or individual action as desired; and to provide improved heating means for rapidly and satisfactorily making coffee in an electric coffee percolator.

The foregoing and other objects and advantages of the invention will be made more apparent as the specification proceeds.

Figure 2:
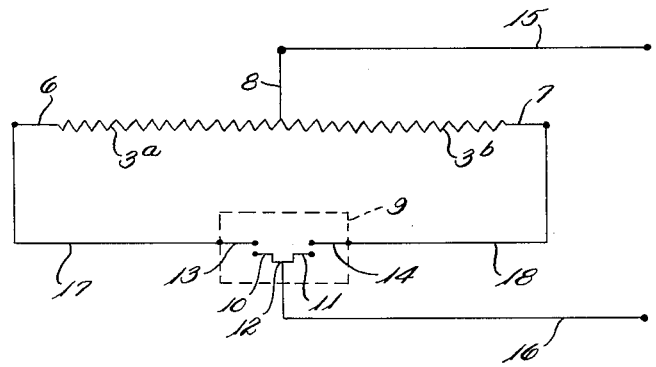

For a better understanding of the present invention, reference now should be had to the accompanying drawing:

Fig. 1 is a perspective view of a heater unit embodying the principles of the invention, and with the finished embedment and cover case being omitted from the heater member; and Fig. 2 is a control circuit or wiring diagram showing the circuitry used in connecting the heater member of Fig. 1 to a small electrical appliance, such as a coffee maker.

When referring to corresponding members shown in the drawing and referred to in the specification, corresponding numerals are used to facilitate comparison therebetween.

Generally speaking, the present invention relates to the combination comprising an electric heater having a core with a single resistance winding thereon, three lead and terminal means connecting to the winding at spaced points thereon to form two resistance circuits therein and extending therefrom with one of such lead and terminal means being common to the pair of resistance circuits formed from the single coil resistance winding, a pair of thermostat means connected to have a common lead and a pair of individual leads extending therefrom, which thermostats are normally closed and are adapted to open at different predetermined operating temperatures, power supply means adapted to be connected to the common lead of the thermostat means and to the common one of the lead and terminal means, and other means connecting the remaining two of the lead and terminal means individually to the remaining individual leads of the thermostat means whereby parallel heater and control circuits are provided so that heating action can be supplied from both of the circuits or from only one of the circuits dependent upon the operating temperature conditions.

Reference now particularly is directed to the accompanying drawings, and in Fig. 1 an electric heater is indicated as a whole by the numeral 1. Such heater 1 preferably is of the type shown in co-pending application, Serial No. 736,393, and is of the general type shown in U.S. Patent No. 2,817,068, referred to hereinbefore. In all events, this heater 1, as shown, includes a tubular core 2 on which a single resistance coil 3 is wound.

The resistance coil 3 has three lead and terminal means connecting thereto at spaced portions thereof. Thus preferably terminals 4, 4 are shown suitably secured, as by welding, to the resistance coil 3 at the ends thereof and a further terminal 5 is connected to the resistance coil 3 in this instance adjacent the center convolution thereof. Three leads 6, 7 and 8 connect, respectively, to the terminals 4, 4 and 5 so that three leads extend from the resistance coil 3 and form, for the circuitry shown and described herein, two different heating coil circuits from the resistance coil 3. Obviously, this center terminal 5 can be positioned at other than the center point of the resistance coil 3 to provide a greater wattage heater action from one of the coils than from the other, as desired.

The solid embedment in which the resistance coil 3 and core 2 are embedded in accordance with the teachings of patent application, Serial No. 736,393 is removed for the purposes of clarity, and preferably a stone-like phosphate embedment is provided in this heater 1. The heater 1 normally is completed by a suitable metal container for the resistance coil and core and the embedment in which they are positioned.

As another important element of the present invention, a dual acting, dual calibrated thermostat 9 is provided in the circuit for control of the heating action from the resistance coil 3. Such thermostat 9 has a pair of suitable bi-metal, or other control strips, indicated at 10 and 11, provided therein and with a common lead 12 extending between such control strips 10 and 11 to provide for connection thereto of the circuits, as hereinafter described. These control strips 10 and 11 in the thermostat 9 are normally closed and have other individual circuit leads 13 and 14 connecting thereto and extending therefrom.

Fig. 2 of the drawing clearly shows that power supply means, such as leads 15 and 16, are connected to the common lead 8 of the resistance coil and terminal means provided therefor and to the common lead 12 of the thermostat 9, respectively. The drawing also clearly brings out that suitable means, such as leads 17 and 18, respectively, connect the end leads 6 and 7 of the resistance coil 3 to the individual leads 13 and 14 coming from the thermostat 9. Thus by the invention, two parallel circuits have been provided in the heater unit and control circuit therefor and with each such circuit having an individual resistance and thermostat control therefor provided therein. Thus, for example, the two heating coils or circuits formed from the resistance coil 3 are connected in parallel and are both closed to have maximum wattage input to a fluid to be heated initially. Then, after the rapid input of initial heat has been supplied to the fluid, one of the thermostat members, such as the control strip 10, would be calibrated so that it would open and the remainder of the heating action would then be provided by the second portion of the resistance coil to have a smaller amount of heat supplied to the material being processed. Obviously such second heating circuit can be caused to pulsate insofar as the supply of heat therefrom is concerned by calibrating the thermostat control strip 11 to cycle from closed to open and back to closed position at appreciably higher temperatures than that temperature at which the thermostat control strip 10 opens. Thus a cyclic supply of additional heat can be provided to the material being processed to raise the temperature thereof but to prevent over-heating such material even with extended supply of power to the control circuit by the leads 15 and 16.

Dual calibrated types of thermostats, such as would be very satisfactory for use in the present invention, are shown in my co-pending applications, Serial Nos. 751,704, now Patent No. 2,925,483, and 751,734, filed concurrently herewith.

The drawing in Fig. 2 shows that the resistance coil 3 is divided up to have individual heating sections, or resistance elements 3a and 3b formed therein so that a pair of heating circuits can be provided in accordance with the teachings of this invention.

From the foregoing, it will be seen that a novel and improved type of an electric heater unit and control circuit therefor has been provided by this invention. Such heater unit is well adapted to provide effective and rapid heating action in a heater control circuit during the initial application of heat thereto, but to reduce the heat input when a desired temperature is reached. Such type of circuit means is especially useful for small electric appliances, such as coffee percolators, but may have other uses, as desired. Obviously in some instances it may be desired that one of the control strips 10 or 11 could be initially in an open condition and close when a predeterminated temperature is reached to provide increased heating action at such later time, as desired. The heater and control circuit therefor can be made very compact in size and can be made with a minimum change from manufacturing operations for similar units made heretofore but only having a single heater coil and heater circuit provided thereby. Hence it is believed that the objects of the invention have been achieved.

Yet a further advantage of the heater and circuit control means is shown is that the heater coil 3b left in the heating circuit can be formed in the lower portion of the heater 1. Hence such coil 3b will be in engagement with, or be below the surface of a residual amount of coffee to keep it warm. The heaters frequently are positioned vertically to extend into an appliance, such as a percolator, from the bottom thereof.

While one complete embodiment of the invention has been disclosed herein, it will be appreciated that modification of this particular embodiment of the invention may be resorted to without departing from the scope of the invention as defined in the appended claims.

What is claimed is:

1. In combination in a compact heater and control circuit therefor, an electric heater having a core with a single resistance winding thereon, three lead and terminal means connecting to said winding at spaced points thereon to form two circuits therein and extending therefrom with one of such lead and terminal means being common to both resistance circuits formed from said resistance winding, a dual thermostat means including a case with two thermostats therein and connected to have a common lead and a pair of individual leads extending therefrom, said thermostats being normally closed and being adapted to open at different predetermined temperatures, said case being permanently closed about said thermostats which are precalibrated, power supply means connecting to said common lead of said thermostat means and to said common one of said lead and terminal means, and means connecting the remaining two of said lead and terminal means individually to the remaining individual leads of said thermostat means.

2. In combination, an electric heater having a core with a single resistance winding thereon, three lead and terminal means connecting to said winding at spaced points thereon and extending therefrom with one of such lead and terminal means being common to both of two resistance circuits formed from said resistance winding, a pair of thermostat means connected to have a common lead and a pair of individual leads extending therefrom, said thermostats being normally closed and being adapted to open at different predetermined temperatures, power supply means being adapted to be connected to said common lead of said thermostat means and to said common one of said lead and terminal means, and means connecting the remaining two of said lead and terminal means individually to the remaining individual leads of said thermostat means.

3. An electric heater and circuit means therefor comprising a single resistance coil heater, three leads connected to said resistance coil at the ends and at an intermediate point thereof, a dual thermostat including a pair of normally closed thermostat means with only a common lead and two circuit leads connected thereto and extending therefrom, said two circuit leads connecting to said resistance coil end leads, and power supply leads connecting to said common lead of said dual thermostat and to said intermediate lead of said resistance coil to form two parallel power circuits each with a thermostat and a resistance therein whereby said single resistance coil heater can provide heating action from both of such circuits and from only one of such circuits dependent upon the action of said dual thermostat.

4. An electric heater and circuit means therefor comprising a single resistance heater, leads connected to said resistance to provide two resistance circuits, a dual thermostat including a pair of thermostat means with a common lead and two circuit leads connected thereto and extending therefrom, and means connecting one said lead from each of said two resistance circuits together, said two circuit leads from said dual thermostat individually connecting to the remaining two of said resistance leads, power supply means being adapted to be connected to said common lead and to said first-named means connecting said resistance circuits together to form two parallel power circuits each with a thermostat and a resistance therein whereby said single resistance heater can provide heating action from both of such circuits and from only one of such circuits dependent upon the action of said dual thermostat and the temperatures to which it is subjected.

5. An electric heater and circuit means therefor comprising a single coil resistance heater adapted to be positioned on a vertical axis to extend into a chamber for heating action, three leads connected to said resistance at the ends and at an intermediate point thereof to provide two resistance circuits in said resistance, one of said resistance circuits including the portion of said resistance adapted to be positioned at the bottom of a chamber and the second of said resistance circuits including the upper portion of said resistance, a dual thermostat having a pair of thermostat means with only a common lead and two circuit leads connected thereto and extending therefrom, said two circuit leads connecting to said resistance end leads, and power supply leads adapted to be connected to said common lead and to said intermediate lead to form two parallel power circuits each with a thermostat and a resistance therein whereby said single resistance heater can provide heating action from both of such circuits and from only one of such circuits dependent upon the action of said dual thermostat, the said thermostat means connected to said second resistance circuit being calibrated to open at a lower temperature than the other of said thermostat means.

6. In combination, an electric heater having a single resistance winding therein, three lead and terminal means connecting to said winding at the ends and another point thereon and extending therefrom to provide two resistance circuits in the resistance winding with one of such lead and terminal means being common to the two resistance circuits formed from said resistance winding, a dual thermostat unit having a pair of precalibrated thermostat means therein for control of different circuits connected within the thermostat unit to have only a common lead and a pair of individual leads extending therefrom, each of said thermostat means being operable at different predetermined temperatures, power supply means connecting to said common lead of said thermostat unit and to said common one of said lead and terminal means, and means connecting the remaining two of said lead and terminal means individually to the individual leads of said thermostat unit to complete two parallel heating circuits each having a series connected resistance winding and a thermostat means therein.

References Cited in the file of this patent

UNITED STATES PATENTS

| | | |
|---|---|---|
| Re. 14,286 | Mann | Apr. 17, 1917 |
| 1,391,329 | Lennig | Sept. 20, 1921 |
| 2,349,612 | Campbell | May 23, 1944 |
| 2,403,803 | Kearsley | July 9, 1946 |
| 2,798,143 | O'Brien | July 2, 1957 |
| 2,799,765 | Jenkins et al. | July 16, 1957 |
| 2,817,068 | Schwing | Dec. 17, 1957 |
| 2,818,487 | Kropp | Dec. 31, 1957 |